United States Patent [19]

Wirt et al.

[11] 4,335,631

[45] Jun. 22, 1982

[54] METHOD FOR MAKING A SHEAR BLADE

[75] Inventors: Leon A. Wirt; Arthur A. Webb, both of Joliet, Ill.

[73] Assignee: Caterpillar Tractor Co., Peoria, Ill.

[21] Appl. No.: 173,202

[22] PCT Filed: Feb. 13, 1980

[86] PCT No.: PCT/US80/00143

§ 371 Date: Feb. 13, 1980

§ 102(e) Date: Feb. 13, 1980

[87] PCT Pub. No.: WO81/02263

PCT Pub. Date: Aug. 20, 1981

[51] Int. Cl.³ .............................................. B21K 19/00
[52] U.S. Cl. ................................ 76/104 A; 144/34 E; 29/416; 72/203
[58] Field of Search ........... 76/101 R, 101 SM, 104 R, 76/104 A; 72/379, 203, 204; 29/413, 414, 416; 144/34 R, 34 E

[56] References Cited

U.S. PATENT DOCUMENTS

| | | | |
|---|---|---|---|
| 2,016,770 | 10/1935 | DeBats | 76/104 R |
| 3,690,353 | 9/1972 | Johnston et al. | 144/34 R |
| 3,797,539 | 3/1974 | Moser | 144/3 D |
| 4,061,167 | 12/1977 | Dunn | 76/101 R |
| 4,069,847 | 1/1978 | Wirt | 144/34 E |
| 4,131,145 | 12/1978 | Puna | 144/34 E |

FOREIGN PATENT DOCUMENTS 840776 5/1970 Canada.

*Primary Examiner*—Roscoe V. Parker
*Attorney, Agent, or Firm*—William B. Heming

[57] ABSTRACT

A shear blade assembly (10) on, for example, a tree harvester (12) has first and second blade portions (14,16) which are urged into opposite portions of a tree circumference to cut the tree. A desirable shape of the blade assembly (10) is a concave configuration which minimizes tree damage and efficiently distributes loads through the shear blade assembly (10). An improved method for making the concave shear blade assembly (10) includes cutting blade surfaces (42,44) on a blank (30) and leaving a web (50) between the surfaces (42,44), then depressing the blank (30) to form the desired shape and dividing the blank (30) along the web (50) to form the first and second blade portions (14,16). Making the surfaces (42,44) before shaping and dividing the blade portions (14,16) overcomes problems stemming from distortion of blades which are cut along a curvature following the step of obtaining the desired shape in the blade assembly (10).

11 Claims, 5 Drawing Figures

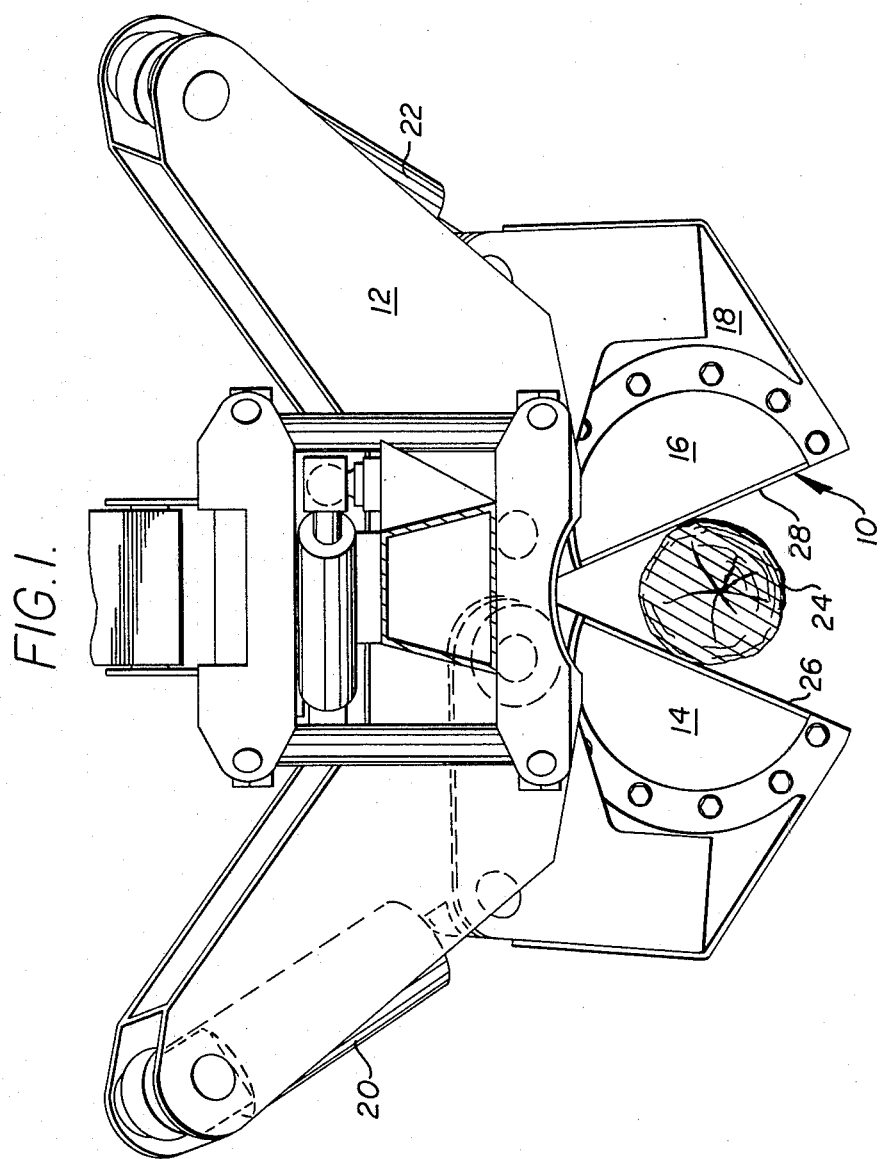

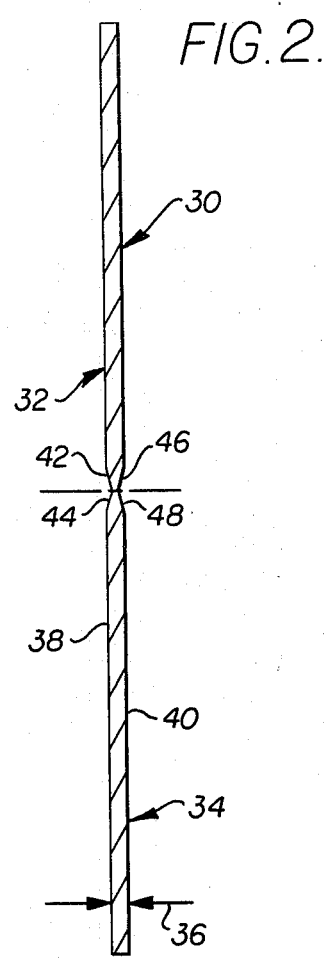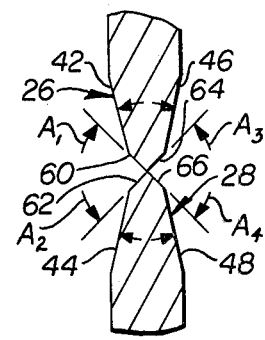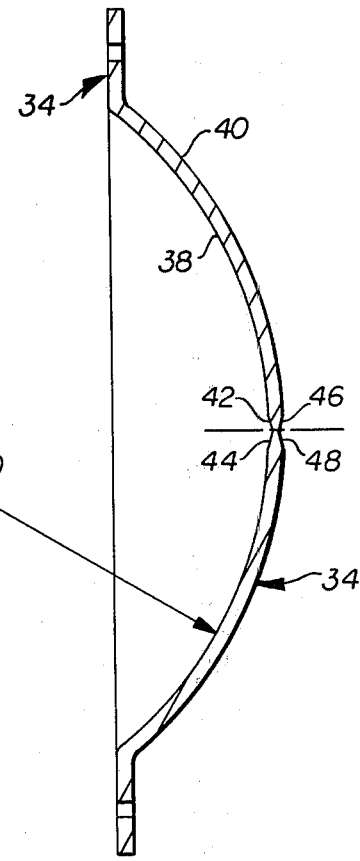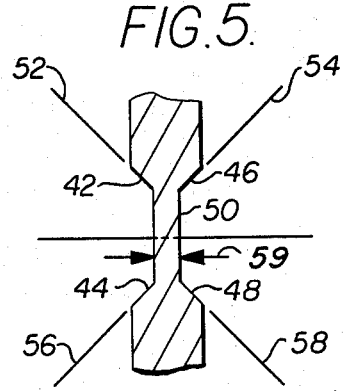

METHOD FOR MAKING A SHEAR BLADE

TECHNICAL FIELD

The invention relates to a method for making shear blade or cutting assemblies. More particularly, the invention relates to a method whereby blade surfaces are first cut on a blank followed by forming the blank into a desired shape before dividing it to form separate blade portions.

BACKGROUND ART

Tree harvesters are in extensive use to hold and cut trees and transport the harvested product to a desired location. Such tree harvesters commonly use a shear blade assembly which has two blade portions each with a cutting edge. The blade portions are urged into opposite sides of a tree in order to sever the trunk for harvesting purposes. The operation and details of such a tree harvester are shown, for example, in U.S. Pat. No. 3,797,539 which issued to Moser et al. on Mar. 19, 1974.

It has become increasingly common to form such shear blade assemblies in a concave, cylindrical or spherical configuration in order to minimize damage to the trees to be cut and to carry cutting loads through the assemblies in a more efficient manner. Such curved blades assemblies are disclosed in U.S. Pat. Nos. 4,069,847 which issued to Wirt on Jan. 24, 1978, and 4,131,145 which issued to Puna on Dec. 26, 1978, and also in Canadian Pat. No. 840,776 which was granted to Brundell and Jonsson AB on May 5, 1970.

Heretofore, such dish-shaped blade assemblies have been manufactured either by depressing a blank to a desired shape, dividing it into first and second portions and then machining cutting edges along the resultant curved edges or by individually making the first and second blade portions from separate pieces of flat plate. The latter method is disclosed briefly in U.S. Pat. No. 3,690,353 which issued to Johnston et al. on Sept. 12, 1972. Where the cutting edges are machined along the curved surfaces, special machining techniques are required to maintain a constant chamfer or beveled edge which is critical to the operation of the curved blades. Where the blade portions of the shear blade assembly are formed separately, there can be some problem with uniformity between portions, as well as duplicate manufacturing operations.

The present invention is directed to overcoming one or more of the problems as set forth above.

DISCLOSURE OF INVENTION

In one aspect of the present invention, a method for making a shear blade assembly includes cutting first and second surfaces on a blank. Next, a generally concave shape is formed in the blank by depressing the blank and first and second blade portions are formed by dividing the blank along the web.

In manufacturing a shear blade assembly, the first and second surfaces must be precisely and uniformly cut in order to form the cutting edges associated with the blade portions. Where such surfaces are cut along the curvature resulting from and following the step of depressing the blank or individual blade portions, it is difficult to maintain necessary tolerances without special machining operations. The present method allows the cutting edges to be made first and then the blank as a whole to be depressed to a desired, uniform, concave shape across the cutting edges.

BRIEF DESCRIPTION OF DRAWINGS

FIG. 1 is a diagrammatic plan view of one embodiment of a shear blade assembly which can be made with the method of the present invention and which is associated with a tree harvester;

FIG. 2 is a diagrammatic cross sectional view of the shear blade assembly of FIG. 1 as it appears at a step of manufacture with one embodiment of the method of the present invention;

FIG. 3 is a diagrammatic cross sectional view of the shear blade assembly of FIG. 1 as it appears during another step of manufacture subsequent to the step shown in FIG. 2;

FIG. 4 is an enlarged diagrammatic cross sectional view of the area associated with the cutting edges of the shear blade during manufacture with the method of the present invention; and FIG. 5 is an enlarged diagrammatic cross sectional view of the area associated with the cutting edges of the shear blade during manufacture with another embodiment of the method of the present invention.

BEST MODE FOR CARRYING OUT THE INVENTION

Referring to the drawings, and particularly to FIG. 1, a shear blade 10 is shown, for example, associated with a tree harvester 12. The shear blade assembly has first and second blade portions 14,16 which are mounted on a frame 18 of the harvester and hydraulically adjustable one relative to the other by hydraulic cylinders 20,22. In harvesting a tree 24, the blade portions are positioned a sufficient distance one from the other and then positioned around the tree. The blade portions are then urged into opposite portions of the tree circumference in order to force respective, related cutting edges 26,28 into the tree. The cutting edges sever the tree which can then be transported as desired.

The first and second blade portions 14,16 each have a generally concave or partly spherical configuration resulting in a concave shape which extends across the cutting edges 26,28 of the shear blade assembly 10 and is best seen when the cutting edges 26,28 are in their mated or closed position.

Referring now to FIGS. 2-4, steps in a method for making the shear blade 10 are represented which results in the shear blade configuration above-described for use with the tree harvester 12. The shear blade is made from a blank 30 which has first and second sides 32,34 and a width 36. The blank is preferably a substantially flat plate cut in a desired shape from a material selected for the type of application to be performed. The width of the blank shown is the perpendicular distance between surfaces 38,40 associated with the first and second sides, respectively.

Initially, the method involves cutting or machining first and second beveled surfaces 42,44 one facing the other on the first side 32 of the blank 30. In other words, the beveled surfaces are each formed at an angle from the planar surface 38 (FIG. 2) associated with the first side and extend from the first side toward the second side 34 of the blank in the direction towards each other. In the embodiment shown, third and fourth beveled surfaces 46,48 are also similarly cut one facing the other on the second side of the blank. The first and third beveled surfaces 42,46 are positioned generally opposite one another at a desired location on the blank to define the first cutting edge 26 (FIGS. 1 and 4) of the associated first blade portion 14 when it is formed. The second and fourth beveled surfaces 44,48 are positioned generally opposite one another and adjacent the first and third beveled surfaces to define the second cutting edge 28 of the associated second blade portion 16 when it is formed.

In the preferred embodiment of the method, the beveled surfaces 42,44,46,48 are cut such that they intersect as is shown in FIG. 2. In cutting the beveled surfaces it may also be desirable to form a web 50 (FIG. 5) which extends from the first and third beveled surfaces to the second and fourth beveled surfaces. Generally, the web will be positioned at a location passing through the intersection of first and third planes 52,54 defined by the first and third beveled surfaces, respectively, and the intersection of second and fourth planes 56,58 defined by the second and fourth beveled surfaces, respectively. The web has a width 59 which is of a substantially smaller magnitude relative to the width of the blank 30 but which must be of sufficient dimensions to maintain the blank 30 in a single piece as the method is performed and until said blank is later divided to form the first and second blade portions as hereinafter discussed.

The next or second step in making the shear blade assembly 10 involves depressing the blank 30 and forming the desired generally concave shape in the blank and across the beveled surfaces 42,44,46,48 (FIG. 3). In other words, the second step involves initiating a curvature in the beveled surfaces as well as other portions of the blank. The operations involved in forming this "dish-shaped" configuration determine the strength of the narrowed area formed by cutting the beveled surfaces necessary to maintain the blank in a single piece while it is being depressed. Following the above, the first and second blade portions 14,16, each having their respective beveled surfaces 42,46;44,48, are formed in a step 3 by dividing the blank, as it is seen in FIG. 3, along the beveled surfaces in a cutting operation or the like.

In the steps represented by FIGS. 2-4, the blank 30 is preferably divided by cutting the first, second, third and fourth beveled surfaces 42,44,46,48 at preselected angles, $A_1$, $A_2$, $A_3$, $A_4$ (FIG. 4) and forming a respective cutting surface 60,62,64,66 on each of the beveled surfaces. The operation of forming the cutting surfaces will divide the blank with no material, or a minimum of extra material, which must be removed in an additional operation. Where a web 50 is utilized, whether or not the angled cutting edges are also formed, it may subsequently be desirable, if not accomplished during the dividing step, to perform some type of finishing operation to remove the web entirely and complete the desired shape of the resultant cutting edges 26,28.

It should be understood that the shear blade may be of other configurations and for other uses as is known in the art without departing from the invention. It should also be understood that the present method may involve other steps and a different order of steps as is known in the art and as herein discussed in making the shear blade without departing from the invention.

INDUSTRIAL APPLICABILITY

In the manufacture of a shear blade assembly 10, such as is used on the tree harvester 12, the cutting edges 26,28 are initially formed from the beveled surfaces 42,44,46,48 cut or machined across a flat blank 30 which simplifies operations involved in making such surfaces.

The desired shape of the blank is then made by depressing the blank in a desired manner, such as at a preselected radius 68. The blank is also heat treated for hardening purposes following step 2 and prior to dividing the blank in step 3 by, for example, machining the cutting surfaces 60,62,64,66. Other manufacturing operations may similarly be performed prior to dividing said blank in order to facilitate handling of, and uniform operations with respect to, both of the blade portions 14,16 while part of the onepiece blank.

Following the step of dividing the blank 30, the first and second blade portions 14,16 are formed and ready for attachment to and use on the tree harvester 12. Where necessary, the beveled surfaces 42,44,46,48 and cutting surfaces 60,62,64,66 are, at this point, machine finished or otherwise treated to remove the excess material and to further define the profile of the cutting edges 26,28 as desired. However, it is anticipated that such operations, which will involve more difficult operations on the curved surfaces, will be minimal owing to the ability to treat and form the beveled surfaces before depressing the blank into its desired curved shape.

Other aspects, objects and advantages will become apparent from a study of the specification, drawings and appended claims.

We claim:

1. A method for making a shear blade (10), comprising:
   (1) cutting first and second beveled surfaces (42,44) one facing the other on a first side (32) of a blank (30);
   (2) depressing said blank (30) and forming a generally concave shape in said blank (30) and across said first and second beveled surfaces (42,44); and
   (3) dividing said blank (30) along said first and second beveled surfaces (42,44) and forming first and second blade portions (14,16) having said first and second beveled surfaces (42,44), respectively.

2. The method, as set forth in claim 1, including the step of cutting a third beveled surface (46) opposite said first beveled surface (42) on a second side (34) of the blank (30) and cutting a fourth beveled surface (48) opposite said second beveled surface (44) on said second side (34) of said blank (30).

3. The method, as set forth in claim 1, wherein said blank (30) is divided by cutting said first and second beveled surfaces (42,44) at preselected angles and forming a cutting surface (60,62) on each of said beveled surfaces (42,44).

4. The method, as set forth in claim 1, wherein cutting said first and second beveled surfaces (42,44) forms a web (50) extending from said first beveled surface (42) to said second beveled surface (44).

5. The method, as set forth in claim 4, wherein said blank (30) is divided by cutting said blank (30) along said web (50).

6. The method, as set forth in claim 2, wherein cutting said first, second, third and fourth beveled surfaces (42,44,46,48) forms a web (50) extending from said first and third beveled surfaces (42,46) to said second and fourth beveled surfaces (44,48).

7. The method, as set forth in claim 6, wherein said first and third beveled surfaces (42,46) define first and third intersecting planes (52,54), respectively, and said second and fourth beveled surfaces (44,48) define second and fourth intersecting planes (56,58), respectively, and said web (50) is formed passing through the intersections of said first and third planes (52,54) and of said second and fourth planes (56,58).

8. The method, as set forth in claim 1, wherein step 2 is performed by depressing said blank (30) at a preselected radius (62).

9. The method, as set forth in claim 4, wherein said blank (30) has a width (36) defined by the distance between said first and second sides (32,34) of said blank (30) and said web (50) has a width (59) of a substantially smaller magnitude relative to said width (36) of said blank (30).

10. The method, as set forth in claim 1, including the step of heat treating said blank (30) following step 2 and prior to step 3.

11. A method for making a shear blade (10), comprising:

(1) cutting first and third beveled surfaces (42,46) opposite one another on first and second sides (32,34) of a blank (30), respectively, and second and fourth beveled surfaces (44,48) opposite one another on said first and second sides (32,34) of said blank (30), respectively;

(2) depressing said blank (30) and forming a generally concave shape in said blank (30) and across said beveled surfaces (42,44,46,48); and (3) cutting said first, second, third and fourth beveled surfaces (42,44,46,48) at preselected angles ($A_1$, $A_2$, $A_3$, $A_4$) and forming first and second blade portions (14,16) having said first and third (42,46) and said second and fourth (44,48) beveled surfaces each with a related angled cutting surface (60,64;62,66), respectively.

* * * * *